JOHN STETSON, OF WEST HARWICH, MASSACHUSETTS.

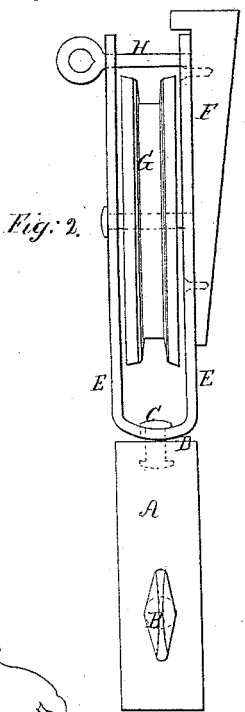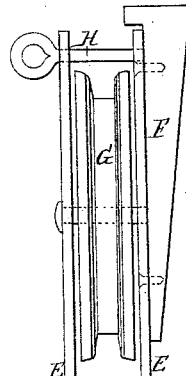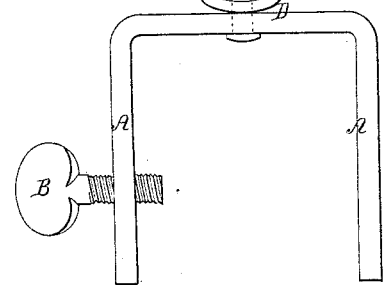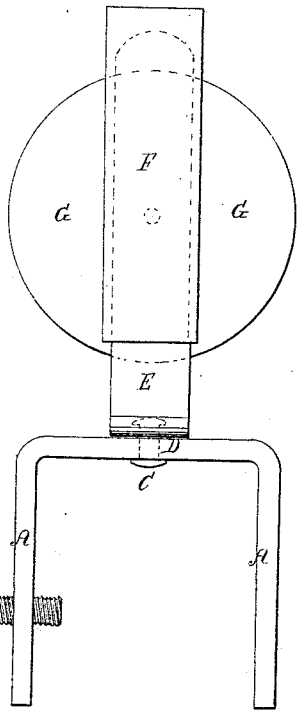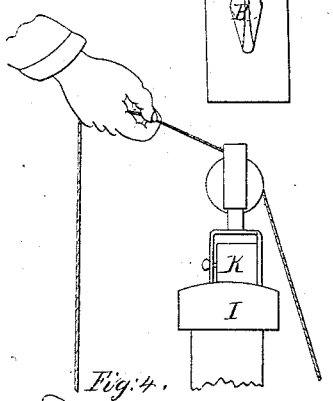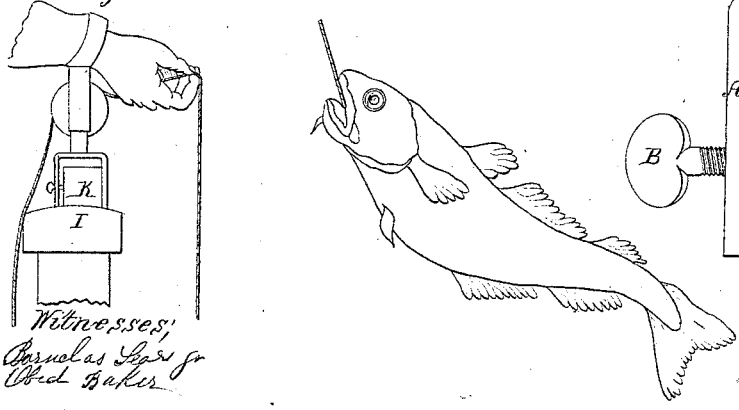

Letters Patent No. 83,740, dated November 3, 1868.

IMPROVEMENT IN FISHING-APPARATUS.

The Schedule referred to in these Letters Patent and making part of the same.

*To all whom it may concern:*

Be it known that I, JOHN STETSON, of West Harwich, in the county of Barnstable, and the State of Massachusetts, have invented a Fishing-Apparatus; and I do hereby declare that the following is a full and exact description thereof, reference being had to the accompanying drawings, and to the letters of reference marked thereon.

To enable others skilled in the art to make and use my invention, I will proceed to describe its construction and operation.

First, the clamp, as shown at A, front view, Figure 2, made of iron, with a thumb-screw, as shown at B, front view, fig. 2, which is screwed firmly on to the gunwale of the vessel or boat. It can be changed from one side of the vessel to the other in a minute, which is very desirable, on account of the influence of the tide upon the line.

Second, the uprights, as shown at E, fig. 2, for supporting the pulley, standing on the clamp, connected to it by a pivot, which causes it to turn in the direction of the weight. Without the pivot-joint, the machine would be useless, as the fish bites often some distance to the right or left of you. Then the line would run across the pulley.

Third, the guard-pin, as shown at H, fig. 2. This prevents the line from running out of the score of the pulley, when going down or coming up. It makes no difference whether it is rough or calm, it works the same.

Fourth is the rest for the hand, as shown at F, fig. 2. The hand gets tired by pulling the line to and fro without some support. The machine would be imperfect without the hand-rest; but when all the parts are put together, it makes a very useful machine.

By experiment, it is found to embrace four points of improvement.

First, it throws the water from the vessel, and the workmen are comparatively dry.

Second, it saves more than half of the line.

Third, they catch more fish, feel the bite much sooner, the line goes down quicker, and also comes up quicker.

Fourth, and greatest point, is the labor which it saves in pulling in the fish—about one-half in two hundred feet of water.

Having thus described my invention,

What I claim, and desire to secure by Letters Patent, is—

The combination of the clamp, thumb-screw, guard-pin, pivot-joint, hand-rest, or their equivalents, with the pulley.

JOHN STETSON.

Witnesses:
JOSHUA WIXON,
NATHANIEL ROBBINS, 2d.